Patented May 24, 1932

1,859,399

UNITED STATES PATENT OFFICE

HANS PAUL KAUFMANN, OF JENA, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

NEW PROCESS FOR INTRODUCING SULPHOCYANIC GROUPS IN ALIPHATIC COMPOUNDS

No Drawing. Original application filed August 21, 1926, Serial No. 130,770, and in Germany August 27, 1925. Divided and this application filed November 30, 1928. Serial No. 322,965.

This application is a division of my application Serial No. 130,770, filed August 21, 1926.

The present invention relates to a new process for introducing sulphocyanic groups into organic compounds.

My new process consists in causing an alkali metal salt of sulphocyanic acid in solution together with a halogen to react on an organic compound.

The reaction can be effected in an aqueous or an acid medium, the new process being therefore of wide application and allowing the production of various organic sulphocyanic compounds of different classes on a technical scale.

It is possible to introduce one or more sulphocyanic groups into aliphatic compounds according to the capability of these compounds to add sulphocyanic groups on double or triple valance bonds in their molecule.

In order to further illustrate my invention the following example is given, the parts being by weight and all temperatures in centigrade degrees, but it is understood, that my invention is not limited to the particular products or reacting conditions mentioned therein.

Example (a) 25 parts of sodium sulphocyanide are dissolved in 150 parts of acetic acid (of 96% strength). Then ethylene and chlorine are allowed to pass through the solution while well stirring and cooling, the ethylene supply being maintained always in excess. When the reaction is finished, the formed ethylene-disulphocyanide is partly found in the precipitate, partly in solution and can be extracted therefrom by means of organic solvents, for instance, ether. The ethereal solution is agitated with a sodium carbonate solution and the ether is evaporated. The ethylene-disulphocyanide or 1.2-disulphocyanogeno-ethane of the formula:

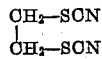

is soluble in water and the usual organic solvents and melts in a pure state at 90° (see Archiv der Pharmazie (2) vol. 85, page 1).

(b) 10 parts of sodium sulphocyanide are dissolved in 60 parts of hydrochloric acid of 15% strength. Then a strong current of ethylene is allowed to pass through the well cooled solution and 6 parts of bromine, dissolved in a suitable amount of hydrochloric acid, are dropped in slowly. The formed ethylene-disulphocyanide is isolated, as described above.

In the same manner sulphocyanic groups may be introduced into acetylene.

I claim:

1. A process which comprises causing an alkali metal salt of sulphocyanic acid in a dissolved form and a halogen to act on an aliphatic compound of an unsaturated character.

2. A process which comprises causing an alkali metal salt of sulphocyanic acid in a dissolved form and a halogen to act in an acidic medium on an aliphatic compound of an unsaturated character.

3. The new process which comprises causing chlorine and a solution of sodium sulphocyanide in acetic acid to act upon ethylene.

4. The new process which comprises causing bromine and a solution of sodium sulphocyanide in aqueous hydrochloric acid to act upon ethylene.

5. The new process which comprises passing a current of ethylene and chlorine through a solution of sodium sulphocyanide in acetic acid.

6. The new process which comprises passing a current of ethylene through a solution of sodium sulphocyanide in aqueous hydrochloric acid, and then slowly adding bromine dissolved in hydrochloric acid.

In testimony whereof, I affix my signature.

HANS PAUL KAUFMANN.